United States Patent [19]

Overby

[11] 3,835,264

[45] Sept. 10, 1974

[54] SEMICONDUCTOR TRANSDUCER COMPRISING AN ELECTRET

[75] Inventor: Sune Lambert Overby, Stockholm, Sweden

[73] Assignee: Telefonaktiebolaget LM Ericsson, Stockholm, Sweden

[22] Filed: Sept. 28, 1972

[21] Appl. No.: 293,123

[30] Foreign Application Priority Data

Oct. 13, 1971 Sweden ............................ 12992/71

[52] U.S. Cl. .......................... 179/111 E, 179/110 B
[51] Int. Cl. ............................................ H04r 23/02
[58] Field of Search ......... 179/111 E, 111 R, 110 B, 179/121 R; 317/235 M

[56] References Cited

UNITED STATES PATENTS

| | | | |
|---|---|---|---|
| 3,356,915 | 12/1967 | Pomekantz | 317/235 M |
| 3,436,492 | 4/1969 | Reedyk | 179/111 E |

*Primary Examiner*—Kathleen H. Claffy
*Assistant Examiner*—Thomas L. Kundert
*Attorney, Agent, or Firm*—Hane, Baxley and Spiecens

[57] ABSTRACT

The invention relates to an electromechanical transducer comprising an electret one side of which faces a control surface of a semiconductor element and the other side of which faces a a movable control electrode to the semiconductor element. The control surface of the semiconductor element is, according to a first plane geometrical pattern, divided into a surface part responsive to an external field and into another surface part not responsive to an external field while the surface of the movable control electrode is divided into an electrically conducting surface part and into an electrically non-conducting surface part according to a second plane geometrical pattern which substantially corresponds to said first plane geometrical pattern. The control electrode is movable in parallel in relation to the field responsive control surface in order to vary the degree of overlapping between said first and second plane geometrical patterns and thereby generate a change in the inherent resistance of the semiconductor element.

4 Claims, 6 Drawing Figures

SEMICONDUCTOR TRANSDUCER COMPRISING AN ELECTRET

The present invention relates to an electromechanical transducer comprising an electret, one side of which faces a control surface of a semiconductor element, the control surface being responsive to an external electrical field, and the other side of which faces a movable control electrode to the semiconductor element, the control electrode being located at a distance from the field responsive control surface so that a change of position, caused by an external influence, between the movable control electrode and the field responsive control surface generating a change in the inherent resistance between a first and a second electrode of the semiconductor element.

The U.S. Pat. No. 3,436,492 shows a transducer of the above defined type which is sensitive to acoustic pressure and which comprises an electret and a field controlled semiconductor element, the electret being put on the control surface of the element. The side of the electret remote from the semiconductor element is covered with a thin metallic layer which constitutes the control electrode of the semiconductor element. The semiconductor element has, furthermore, a first and a second electrode for connection with an external circuit which principally consists of a voltage source in series with a load impedance.

The basic principle for this known transducer is that acoustic waves produce vibrations in the electret, which means size variations of the microscopical air gap existing between the electret and the control surface of the semiconductor element, the current through the semiconductor element to the load impedance showing the corresponding variations. The transducer should, in order to obtain an acceptable efficiency, be constructed in such a way that the control surface of the semiconductor element will have as high field sensitivity as possible, which considering the basic principle of the transducer must imply that the control surface ought to have as far as possible constant field sensitivity in all points of the surface and ought to be totally covered by the control electrode. This again would imply that an increase of the inherent gain of the semiconductor element through splitting up its control surface for example in the manner shown in U.S. Pat. No. 3,436,622 would not lead to an increased efficiency of the known transducer.

The microscopical air gap between the electret and the semiconductor element in the known transducer exists because of irregularities in the two facing surfaces, for example in the form of particles of dust, which actually implies that a rising acoustic level increases the amount of points of contact between said surfaces, distortion arising and the efficiency of the transducer being reduced. At acoustic shock levels, which when using the known transducer in a microphone may occur as a result of coughing, can cause the pressure on the control surface of the semiconductor element to be so high that the surface is damaged leading to a permanent decrease of the efficiency of the transducer.

In accordance with the present invention a transducer without the said disadvantages will be obtained through constructing the transducer in such a way as it is described in the appended claims.

The invention will now be described with reference to the accompanying drawings wherein.

Figure 1:
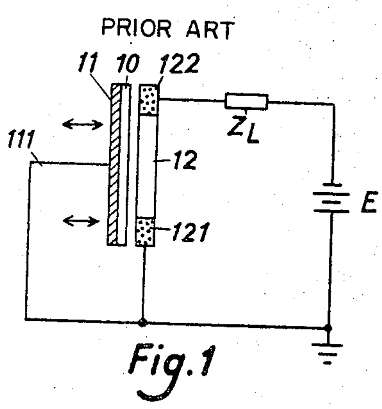
FIG. 1 shows an electric circuit diagram which discloses the basic principle of the known transducer.

Referring to FIG. 1 the basic principle for the transducer known through U.S. Pat. No. 3,436,492 is shown. A thin metallic layer on an electret 10 constitutes a movable control electrode 11 to a field controlled semiconductor element 12 which has two fixed electrodes 121 and 122, which from now on will be called emitter and collector respectively. The movable control electrode 11 has an electric connection 111 to the emitter 121 so that a closed electric circuit is established in which the facing sides of the control electrode 11 and the semiconductor body 12 constitute a plate capacitor, in which the positive and negative electric charges of the electret 10 exist on opposite plates.

The direction of motion of the control electrode 11 is perpendicular to the surface of the semiconductor element 12, and it influences the capacitance of the plate capacitor so that its motion changes the distance between the plates, according to the relation:

$$\epsilon A/(d \pm \Delta d) = C \pm \Delta C$$

where $C$ is capacitance of the plate capacitor $\epsilon$ is a constant depending on the type of insulation used between the plates of the capacitor $A$ is the area with which the plates overlap each other, and $d$ is the distance between the plates Upon a change of capacitance $\Delta C$ in the capacitor a change occurs in the electric voltage between the positive and negative electric charges that exist on opposing sides of the electret 10. This change of voltage influences the inherent resistance between the emitter 121 and the collector 122 of the field controlled semiconductor element 12. A connection of the electrodes to a voltage source E in series with a load impedance $Z_L$ implies that the perpendicular movement of the control electrode 11 in relation to the surface of the semiconductor element 12 will control an electric effect given to the load impedance $Z_L$.

Figure 2:
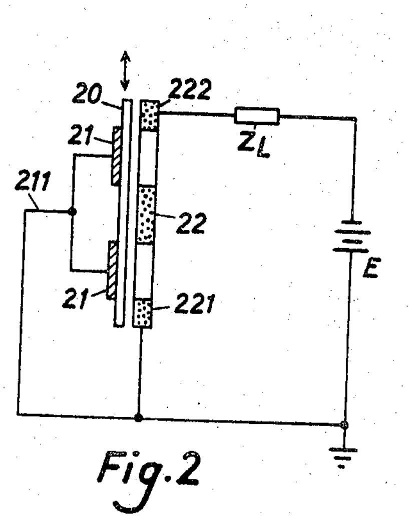
FIG. 2 shows an electric circuit diagram which discloses the basic principle for the transducer according to the invention.

In FIG. 2 the basic principle of the transducer according to the invention is shown. Like the known transducer shown in FIG. 1, a thin metallic layer on an electret 20 constitutes movable control electrode 21 to a field controlled semiconductor element 22 which has an emitter 221 and a collector 222. An electric connection 211 is arranged between the movable control electrode 21 and the emitter 221 whereby a closed circuit is obtained in which the facing sides of the control electrode 21 and the semiconductor 22 constitute a plate capacitor.

In FIG. 2, in contrast to what is shown in FIG. 1, the direction of motion of the control electrode 21 is parallel to the surface of the semiconductor element 22 and it influences the capacitance of the plate capacitor so that its motion changes the overlapping area of the plates in accordance with the following expression:

$\epsilon(A \pm \Delta A)/d = C \pm \Delta C$

At a connection of the emitter 221 and the collector 222 to a voltage source E in series with a load impedance $Z_L$ the parallel movement of the control electrode 21 along the surface of the semiconductor element 22 will control the electric effect that is supplied to the load impedance $Z_L$. From the principle point of view the parallel movement of the control electrode 21 in FIG. 2 obviously gives the same result as the movement of control electrode 11 perpendicular to the semiconductor body 12, that is shown in FIG. 1. The choice between the two directions of motion depends therefore on practical aspects, such as which device is more efficient.

Upon an external influence that gives the control electrode 11 a dislocation Δ d the change of the inherent resistance in the field controlled semiconductor element 12 increases more the smaller is the distance *d* between the control electrode 11 and the semiconductor element 12. In a practical application the electret 10 may be brought in direct contact with the surface of the semiconductor element 12. The distance *d* will then be the sum of the thickness of the electret 10 and a varying microscopical air gap caused by surface irregularities in the form of for example dust particles, implying that a considerable change of the inherent resistance, calculated by percentage, in the semiconductor element 12 is obtainable at a dislocation distance Δ d in the magnitude of 1 μm. A dislocation distance of 1 μm for an assumed parallel movement of the control electrode 11 and for a practical area A of the electrode and of the semiconductor element 12 would on the contrary give a neglectably low change of resistance, calculated by percentage, in the semiconductor element 12.

With the transducer according to the invention, however, it is practically possible to achieve a considerable change of resistance, calculated by percentage in the semiconductor element 22 in FIG. 2 for a parallel movement of the control electrode 21 in the magnitude of 1 μm. The possibility thereof is explained by the fact that according to the invention the semiconductor element 22 is constructed in such way that its surface is, according to a first plane geometrical pattern, divided into a surface part responsive to an external field and another surface part not responsive to an external field. Furthermore, the movable control electrode 21 is arranged in such a way that its surface is divided into an electrically conducting surface part and into an electrically non-conducting surface part according to a second plane geometrical pattern which substantially corresponds to said first plane geometrical pattern. The infra structure of the pattern can in a practical embodiment have dimensions in the magnitude of μm. Through an externally influenced dislocation of the movable control electrode the degree of coverage between said pattern is changed which provides a corresponding change in the inherent resistance between the emitter 221 and the collector 222 in the semiconductor element 22.

Figure 3:
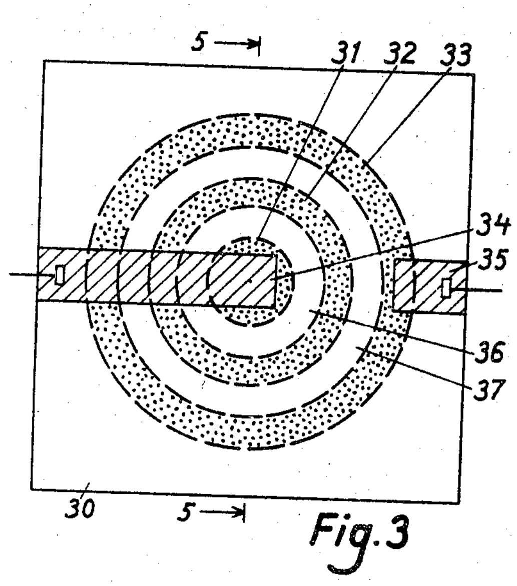
FIG. 3 shows a plan view of a field controlled semiconductor element.

FIG. 3 shows a plan view of a field controlled semiconductor element 30 included in an embodiment of the transducer according to the invention. The semiconductor element 30 is composed of three heavily doped and concentrically arranged regions 31, 32 and 33, which are of p-type and are diffused in a substrate of n-type. The region 31 is connected to a metal layer 34 which constitutes the emitter-connection of the semiconductor element 30, while the region 33 is connected with a metal layer 35 which constitutes the collector-connection. The surface between the emitter region 31 and the collector region 32 of the semiconductor element 30 constitutes a control surface which through the region 32 is divided into a surface part, that is responsive to an external field, and consists of two concentric ring shaped areas 36 and 37 and into a surface part that is not responsive to an external field, and corresponds to the region 32. Owing to the fact that the ring shaped areas 36 and 37 are concentrically arranged the semiconductor element 30 can obtain a high voltage gain provided that the areas of the crosscuts of the regions 36 and 37 are substantially equal.

Figure 4:
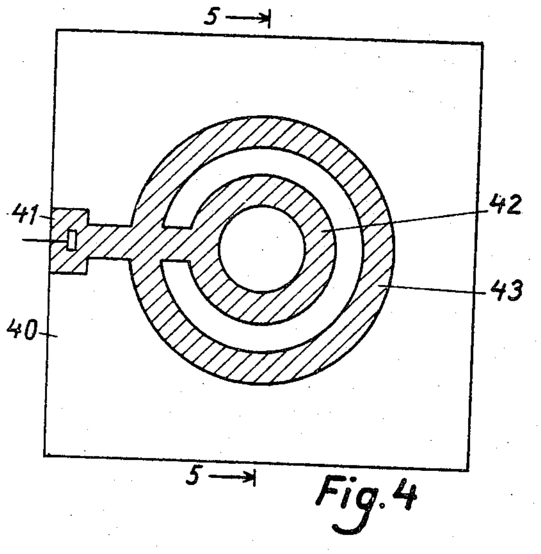
FIG. 4 shows a plan view of an electret, the semiconductor element and the electret being included in an embodiment of the transducer according to the invention.

FIG. 4 shows a plan view of an electret 40 which has a thin metallic layer 41 the surface of which is divided into an electrically conducting surface part consisting of two concentric rings 42 and 43 and into an electrically non-conducting surface part between the rings 42 and 43 and inside and outside of these. The purpose of the metallic layer 41 in the transducer is to constitute a control electrode to the field controlled semiconductor body 30 in FIG. 3, the charges that exist on opposing sides in the electret 40 generating a control voltage to the semiconductor element 30 and the plane geometrical pattern in the surface of the metallic layer 40 being as exactly as possible adapted to the plane geometrical pattern of the control surface of the semiconductor element 30 in such a way that the ring shaped field responsive areas 36 and 37 will totally cover the rings 42 and 43 respectively of the metallic layer. It is obvious that for a dislocation movement of a limited amplitude between the electret 40 and the semiconductor element 30 the degree of coverage between the field responsive areas 36 and 37 and the conducting rings 42 and 43 respectively will decrease quickly and linearly with the magnitude of dislocation.

Figure 5:
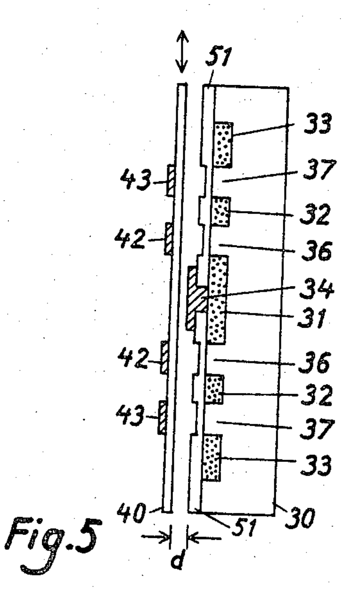
FIG. 5 shows a section view taken from section lines 5—5 of the transducer in accordance with FIGS. 3 and 4.

FIG. 5 shows a section view along the section lines 5—5 of the elements shown in FIGS. 3 and 4 with the same reference numerals as previously used. The electret 40 is shown in its intended rest position in relation to the semiconductor element 30 and is movable in parallel along the surface of the same with a constant air gap $d > 10$ μm. An insulating oxide layer 51 on the semiconductor element 30 is, according to the example, thinner above the ring shaped areas 36 and 37 in order to increase their field sensitivity. With these variations in the thickness of the oxide layer 51 the doped region 32 is in principle no indispensable, but the layer 51 could by itself provide a field responsive plane geometrical pattern on the surface of the semiconductor element 30. The region 32 could also be replaced by a metallic layer arranged on the same place on the surface of the semiconductor element 30 which metallic layer would constitute a second control electrode which should be given a fixed potential from a low supply impedance in order to define a working point for the transducer.

The plane geometrical pattern of the semiconductor element 30 and the metallic layer 41 may of course contain more than two field responsive rings and electrically conducting rings respectively and may furthermore for example contain parallel field responsive areas and electrically conducting areas respectively that are rectangularly shaped instead of being ring shaped. The infra structure of the patterns shall in any case have dimensions that are chosen with regard to the amplitude of the dislocation movement which the electret is supposed to perform.

Figure 6:
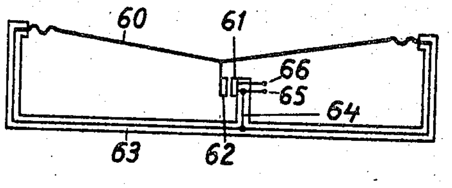
FIG. 6 shows a schematic section view of a microphone consisting of a diaphragm and a transducer that is constructed according to FIGS. 3–5 and is influenced by the vibrations of the diaphragm.

FIG. 6 shows a schematic section view of a microphone consisting of an aluminium diaphragm 60, a field controlled semiconductor element 61, an electret 62, and a housing 63. The aluminium diaphragm 60 is part of an electric connection 64 of a metallic layer on the side of the electret 62 remote from the semiconductor element 61 to an electrode 65 of the semiconductor element 61. The electrode 65 and a second electrode 66 of the semiconductor element 61 are in accordance to what is shown in FIG. 2 intended to be connected to an external circuit which principally consists of a voltage source in series with a load impedance, the latter corresponding to the input impedance of a voltage amplifier. The semiconductor element 61 and the electret 62 are constructed in such a way that they constitute an electromechanical transducer according to the principle of the invention and may for example be constructed in accordance with FIGS. 3, 4 and 5.

Other applications of the electromechanical transducer according to this invention are switches in which for example a manually operated piston or a permanent-magnetic reed, operated by the magnetic field of a relay coil, influence the transducer.

The invention is of course not limited to a linear parallel movement between the electret and the semiconductor element, but a varying degree of coverage between the plane geometrical patterns of the two can also be obtained by means of for example a torsional movement.

We claim:

1. An electromechanical transducer comprising: a planar semiconductor element of a first type of semiconductor material having a control surface with a central region and at least two annular regions concentric with said central region, said central region and said annular regions being of a second and complementary type of semiconductor material, first terminal means connected to said central region, second terminal means connected to the annular region most remote from said central region; a planar control electrode disposed parallel to and spaced from said planar semiconductor element, and opposite said control surface, said control electrode comprising at least two concentric annular elements of conductive material, one of said annular elements being contoured to be substantially congruent with the area between the two annular regions of said planar semiconductor element, the other of said annular elements being contoured to be substantially congruent with the area between the central region and the annular region adjacent thereof of said planar semiconductor element, and means for conductively connecting said annular elements; a planar electret disposed between and parallel to said planar semiconductor element and said planar control electrode; and means for relatively moving said planar control electrode and said planar semiconductor element relative to each other in a direction parallel to the plane of said electret to vary the degree of overlap between the regions of the second type of semiconductor material of said planar semiconductor element and the annular elements of said planar control electrode and thereby the capacitance therebetween so that the electric field influencing said control surface varies to vary the inherent resistance between said first and second terminal means of said planar semiconductor element.

2. The electromechanical transducer of claim 1 wherein said planar control electrode is fixed to the surface of said planar electret remote from said planar semiconductor material.

3. The electromechanical transducer of claim 1 wherein said planar control electrode and said control surface are separated by said planar electret and an air gap greater than $10^{-6}$ meters.

4. The electromechanical transducer of claim 1 further comprising a diaphragm mechanically connected to said planar semiconductor element so that movement of said diaphragm moves said planar control electrode with respect to said control surface whereby the electromechanical transducer is a microphone.

* * * * *